(12) United States Patent
Kurosaki et al.

(10) Patent No.: US 11,976,689 B2
(45) Date of Patent: *May 7, 2024

(54) SLIDING MEMBER AND BEARING

(71) Applicant: Senju Metal Industry Co., Ltd., Tokyo (JP)

(72) Inventors: Kimihiko Kurosaki, Tokyo (JP); Kenzo Tadokoro, Tokyo (JP); Minoru Toyoda, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 184 days.

This patent is subject to a terminal disclaimer.

(21) Appl. No.: 16/899,010

(22) Filed: Jun. 11, 2020

(65) Prior Publication Data

US 2020/0392993 A1 Dec. 17, 2020

(30) Foreign Application Priority Data

Jun. 12, 2019 (JP) ................. 2019-109680

(51) Int. Cl.
*F16C 33/12* (2006.01)
*C08K 3/04* (2006.01)
(Continued)

(52) U.S. Cl.
CPC .............. *F16C 33/122* (2013.01); *C08K 3/11* (2018.01); *C08L 27/18* (2013.01); *F16C 17/02* (2013.01);
(Continued)

(58) Field of Classification Search
CPC .... C08K 3/04; C08K 3/11; C08K 2003/2206; C08K 2003/2255; C08K 2003/2265; C08K 2003/2296; C08K 2003/3045; C08L 27/18; C10M 2201/041; C10M 2201/062; C23C 28/00; F16C 17/02; F16C 29/02; F16C 33/122; F16C 33/201; F16C 33/203;
(Continued)

(56) References Cited

U.S. PATENT DOCUMENTS 4,847,135 A * 7/1989 Braus .................... F16D 69/026
508/109
5,354,622 A 10/1994 Nakamaru et al.
(Continued)

FOREIGN PATENT DOCUMENTS

CN 105765246 A 7/2016
DE 69317605 T2 8/1998
(Continued)

*Primary Examiner* — James C Goloboy
(74) *Attorney, Agent, or Firm* — The Webb Law Firm

(57) ABSTRACT

A sliding member includes a metallic substrate, a porous layer formed on a surface of the metallic substrate, and a sliding layer that covers the porous layer. The porous layer is made of a metal itself or an alloy composition. The sliding layer is made of a lead-free resin composition. The resin composition contains an essential additive, optionally an optional additive, and a fluororesin. The essential additive is any one of a combination of a zinc compound and a carbon fiber, a combination of a zinc compound and an iron oxide, and a combination of a zinc compound, a carbon fiber and
(Continued)

an iron oxide. A total content of the essential additive and the optional additive is 10 vol % or more and 35 vol % or less in the resin composition.

8 Claims, 2 Drawing Sheets

(51) Int. Cl.
    *C08K 3/11*    (2018.01)
    *C08K 3/22*    (2006.01)
    *C08K 3/30*    (2006.01)
    *C08L 27/18*    (2006.01)
    *C23C 28/00*    (2006.01)
    *F16C 17/02*    (2006.01)
    *F16C 29/02*    (2006.01)
    *F16C 33/20*    (2006.01)

(52) U.S. Cl.
CPC ............ *F16C 29/02* (2013.01); *F16C 33/201* (2013.01); *F16C 33/203* (2013.01); *F16C 33/206* (2013.01); *C08K 3/04* (2013.01); *C08K 2003/2206* (2013.01); *C08K 2003/2255* (2013.01); *C08K 2003/2265* (2013.01); *C08K 2003/2296* (2013.01); *C08K 2003/3045* (2013.01); *C10M 2201/041* (2013.01); *C10M 2201/062* (2013.01); *C23C 28/00* (2013.01); *F16C 2204/00* (2013.01); *F16C 2204/50* (2013.01); *F16C 2208/32* (2013.01)

(58) Field of Classification Search
CPC ................ F16C 33/206; F16C 2204/00; F16C 2204/50; F16C 2208/32
See application file for complete search history.

(56) References Cited

U.S. PATENT DOCUMENTS

| | | | |
|---|---|---|---|
| 5,433,870 A | | 7/1995 | Nakamaru et al. |
| 6,162,767 A | * | 12/2000 | Adam ...................... C08K 3/22 |
| | | | 508/108 |
| 11,261,914 B2 | * | 3/2022 | Kurosaki ................ C08K 3/04 |
| 2004/0126041 A1 | | 7/2004 | Bickle et al. |
| 2007/0164151 A1 | | 7/2007 | Luce |
| 2007/0194172 A1 | | 8/2007 | Luce et al. |
| 2015/0147012 A1 | | 5/2015 | Scancarello |
| 2015/0323007 A1 | * | 11/2015 | Sato .......................... B22F 7/06 |
| | | | 384/154 |
| 2016/0319867 A1 | * | 11/2016 | Adam ...................... C08K 3/30 |
| 2017/0081522 A1 | | 3/2017 | Adam et al. |
| 2018/0355271 A1 | * | 12/2018 | Kim ................... C10M 101/025 |
| 2019/0186539 A1 | | 6/2019 | Kurosaki et al. |

FOREIGN PATENT DOCUMENTS

| | | |
|---|---|---|
| DE | 69327377 T2 | 6/2000 |
| DE | 10126463 A1 | 2/2003 |
| DE | 102011077008 A1 | 12/2012 |
| EP | 2532905 A1 | 12/2012 |
| JP | S62127227 A | 6/1987 |
| JP | S62184225 A | 8/1987 |
| JP | 2747582 B2 | 2/1998 |
| JP | 2002327750 A | 11/2002 |
| JP | 2009523641 A | 6/2009 |
| JP | 2009523642 A | 6/2009 |
| JP | 2012251616 A | 12/2012 |
| JP | 2017509837 A | 4/2017 |
| JP | 6323607 B1 | 4/2018 |

\* cited by examiner

SLIDING MEMBER AND BEARING

CROSS-REFERENCE TO RELATED APPLICATIONS

This application claims priority from Japanese Patent Application No. 2019-109680 filed on Jun. 12, 2019, the entire subject matter of which is incorporated herein by reference.

BACKGROUND OF INVENTION

Technical Field

The present invention relates to a sliding member slidably supporting a mated member and a bearing using the sliding member.

Background Art

A sliding material having a so-called bimetal structure, namely, a two-layer structure in which a Cu-based alloy powder is sintered on a steel plate as a back plate has been often used as a sliding member. In this case, a surface of a metal layer on which the Cu-based alloy powder has been sintered becomes a sliding surface, so that good slidability is ensured by adding lead (Pb) to the Cu-based alloy powder which has been used in the past.

On the other hand, use of Pb has been limited in various kinds of fields in recent years because of harmful effects to human health and a material without using Pb has been proposed for a sliding member. For example, Patent Literature 1 discloses a sliding member using a resin material as a sliding material without using Pb.

Further, Patent Literature 2 discloses a bearing which contains a past sliding member using a resin material and having a three-layer structure in which a powder of a Cu-based alloy or the like has been sintered on a metal support layer so as to be porous and a rough surface is formed, and a resin composition is impregnated to the rough surface and is baked.

In addition to Patent Literature 2, in order to improve the abrasion resistance and load capacity of a resin-based sliding coating film, Patent Literature 3 discloses a technique of adding a sulfide such as barium sulfate or zinc sulfide.

CITATION LIST

Patent Literature

Patent Literature 1: JP S62-127227 A
Patent Literature 2: Japanese Patent No. 2747582
Patent Literature 3: JP 2017-509837 A

SUMMARY OF INVENTION

It has been found that, as for a sliding member having a three-layer structure, various characteristics such as an elastic modulus are good enough to be comparable to characteristics of metallic sliding bearing materials, but further improvement of various characteristics such as an elastic modulus is required to prevent deformation of a sliding layer due to a resin.

The present invention addresses such an issue and has an object to provide a sliding member having improved various characteristics such as an elastic modulus, and a bearing using the sliding member.

The present inventors have found that a resin composition for forming a sliding layer contains a predetermined amount of a zinc compound, and further contains at least one of a carbon fiber and an iron oxide, so that an elastic modulus can be improved.

The present invention provides the following sliding member and bearing.

(1) A sliding member comprising:
  a metallic substrate;
  a porous layer formed on a surface of the metallic substrate; and
  a sliding layer that covers the porous layer,
  wherein the porous layer is made of a metal itself or an alloy composition,
  wherein the sliding layer is made of a lead-free resin composition,
  wherein the resin composition contains an essential additive, optionally an optional additive, and a fluororesin,
  the essential additive being any one of a combination of a zinc compound and a carbon fiber, a combination of a zinc compound and an iron oxide, and a combination of a zinc compound, a carbon fiber and an iron oxide,
  the optional additive being at least one selected from the group consisting of barium sulfate, aramid fibers, graphite, molybdenum disulfide, calcium compounds, and zinc or zinc alloys,
  wherein a total content of the essential additive and the optional additive is 10 vol % or more and 35 vol % or less in the resin composition.

(2) The sliding member according to the above (1), wherein the resin composition consists of the essential additive, and optionally the optional additive, with the remainder being the fluororesin.

(3) The sliding member according to the above (2), wherein the optional additive is barium sulfate.

(4) The sliding member according to the above (2), wherein the optional additive is at least one selected from the group consisting of aramid fibers, graphite, molybdenum disulfide, calcium compounds, and zinc or zinc alloys.

(5) The sliding member according to the above (2), wherein the resin composition consists of the essential additive with the remainder being the fluororesin.

(6) The sliding member according to any one of the above (1) to (5),
  wherein a content of the zinc compound is 0.5 vol % or more and 20 vol % or less in the resin composition,
  a content of the carbon fiber is 0 vol % or more and 20 vol % or less in the resin composition, and
  a content of the iron oxide is 0 vol % or more and 20 vol % or less in the resin composition.

(7) The sliding member according to any one of the above (1) to (6),
  wherein the fluororesin contains polytetrafluoroethylene and 0 vol % or more and 20 vol % or less of another fluororesin other than polytetrafluoroethylene.

(8) The sliding member according to any one of the above (1) to (7), wherein the essential additive is the combination of a zinc compound and a carbon fiber.

(9) The sliding member according to any one of the above (1) to (7), wherein the essential additive is the combination of a zinc compound and an iron oxide.

(10) The sliding member according to anyone of the above (1) to (7), wherein the essential additive is the combination of a zinc compound, a carbon fiber and an iron oxide.

(11) The sliding member according to the above (1), wherein the essential additive is only the combination of a zinc compound and an iron oxide, and the optional additive is only barium sulfate.

(12) A bearing comprising the sliding member according to any one of the above (1) to (11), wherein the sliding layer is a cylindrical internal circumference and annular innermost layer.

In the present invention, a resin composition forming a sliding layer contains a predetermined amount of a zinc compound, and further contains at least one of a carbon fiber and an iron oxide, so that an elastic modulus of the resin composition can be improved, deformation of the sliding layer can be prevented by improvement of the elastic modulus, and an increase or decrease in a contact area due to deformation of the sliding layer caused by an external force can be prevented.

DETAILED DESCRIPTION OF THE INVENTION

Embodiments of a sliding member in the present invention and embodiments of a bearing to which the sliding member of the present invention is applied are described below with reference to the drawings.

Configuration Example of Sliding Member in Present Embodiment

The sliding member in the present embodiment is formed of a lead-free resin composition. The sliding member is used so as to cover a surface of a metallic porous material provided on a surface of a metallic substrate.

The resin composition contains a fluororesin as an essential additive. In addition, the resin composition contains a zinc compound as an essential additive, and further contains either of a carbon fiber or an iron oxide or both of the carbon fiber and iron oxide as an essential additive.

The resin composition may contain barium sulfate as an optional additive. The resin composition may contain any of or a plurality of aramid fibers, graphite, molybdenum disulfide, a calcium compound, and zinc or zinc alloy, as an optional additive.

In the resin composition, a total content of the essential additives excluding the fluororesin is 10 vol % or more and 35 vol % or less in the resin composition. In the case where the resin composition contains an optional additive in addition to the essential additives excluding the fluororesin, a total content of the essential additives excluding the fluororesin and the optional additives is also 10 vol % or more and 35 vol % or less in the resin composition.

Figure 1:
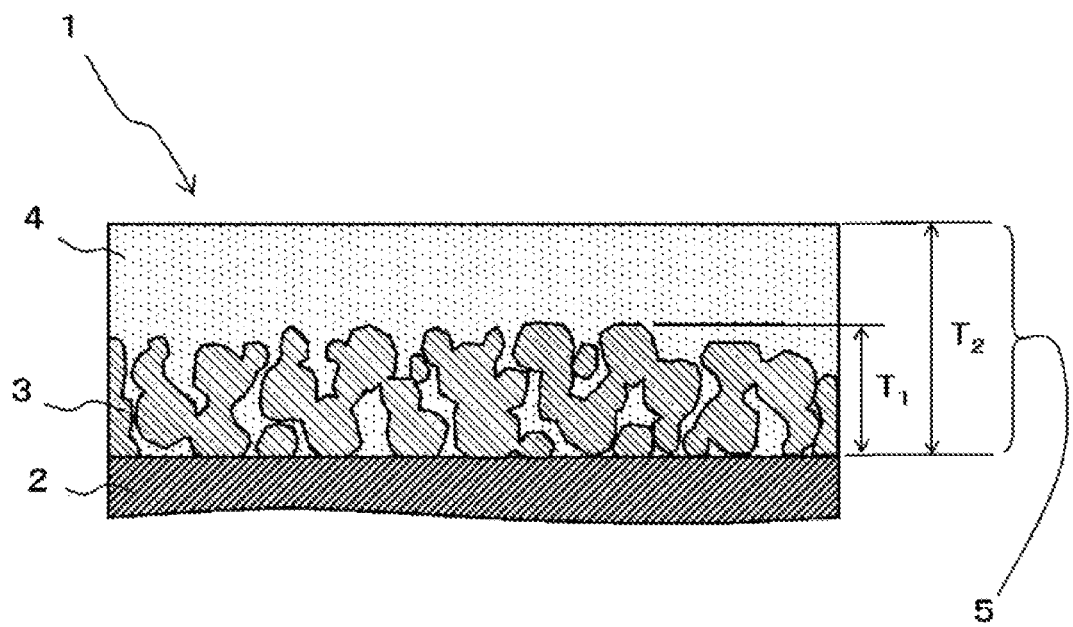
FIG. 1 is a sectional view of a sliding member, as an example, in the present embodiment.

FIG. 1 is a sectional view of a sliding member, as an example, in the present embodiment. A sliding member 1 in the present embodiment contains a metallic substrate 2, a porous layer 3 formed on a surface of the metallic substrate 2, the porous layer being made of a metal itself or an alloy composition, and a sliding layer 5 in which the porous layer 3 is covered with a resin composition 4.

The porous layer 3 is formed by sintering a metallic powder on a surface of the metallic substrate 2. In this embodiment, a copper plated steel plate in which copper (Cu) has been plated on an iron (Fe)-based plate is used as the metallic substrate 2. As the metallic powder forming the porous layer 3, Cu itself or an alloy containing Cu as a main component is used, and a Cu—Sn based alloy powder is used in this embodiment.

In a manufacturing method of the porous layer 3, the Cu—Sn based alloy powder is sprayed on the copper plated steel plate with a desired thickness thereof and the copper plated steel plate on which the Cu—Sn based alloy powder has been sprayed is sintered in a sintering furnace. As a result, the porous layer 3 made of a Cu—Sn based alloy with a desired thickness thereof is formed on the copper plated steel plate.

The porous layer 3 is impregnated with the resin composition 4 so as to have a predetermined thickness thereof and the porous layer 3 that has been impregnated with the resin composition 4 is baked, and then, the sliding layer 5 is formed. In this embodiment, as the resin composition 4, a resin and additives are mixed. As the resin, polytetrafluoroethylene (PTFE) is used as an example of the fluororesin.

The resin composition 4 contains a zinc compound as an essential additive, and further contains either of a carbon fiber or an iron oxide or both of the carbon fiber and iron oxide, as an essential additive.

In a manufacturing method of the sliding layer 5, a predetermined amount of the resin composition 4 is supplied onto the porous layer 3 formed on the surface of the metallic substrate 2, and the resin composition 4 is pressed on the porous layer 3, so that the porous layer 3 is impregnated with the resin composition 4. The amount of the resin composition 4 supplied onto the porous layer 3 is an amount of the resin composition 4 which covers the porous layer 3 with a thickness such that the porous layer 3 is not exposed from a surface of the sliding layer 5 after the resin composition 4 is baked, which is described later.

When the resin composition 4 is heated at a temperature which exceeds a melting point of a resin contained in the resin composition 4, the resin is melted and an organic solvent is volatilized, and then, the resin is hardened and the sliding layer 5 is formed. Here, the term "bake" is referred to as "heating the resin composition 4 at a predetermined temperature to form the sliding layer 5". The melting point of polytetrafluoroethylene used as the resin is 327° C.

The sliding layer 5 is baked using the baking furnace in this embodiment by heating the resin composition 4 at a temperature which exceeds the melting point of polytetrafluoroethylene.

In the sliding member 1 in this embodiment, all of the metallic powders for forming the porous layer 3 may have a particle diameter within a range of about 15 μm to 180 μm, preferably about 25 μm to 150 μm. In addition, in the sliding member 1, a thickness $T_1$ of the porous layer 3 formed by using the metallic powders having such a particle diameter may be set to be about 0.06 mm to 0.35 mm. The thickness of the porous layer 3 is a thickness such that at least two pieces of the metallic powders are laid in piles and sintered.

Further, in the sliding member 1, a thickness $T_2$ of the sliding layer 5 may be set to be about 0.08 mm to 0.43 mm. Here, the thickness $T_2$ of the sliding layer 5 is referred to as "a thickness of the sliding layer 5 from a surface of the metallic substrate 2". The thickness of the sliding layer 5 is set to be averagely larger than the thickness of the porous layer 3 so that the porous layer 3 is not exposed. In this embodiment, the thickness $T_2$ of the sliding layer 5 is set to be 0.3 mm.

Configuration Example of Bearing in Present Embodiment

Figure 2:
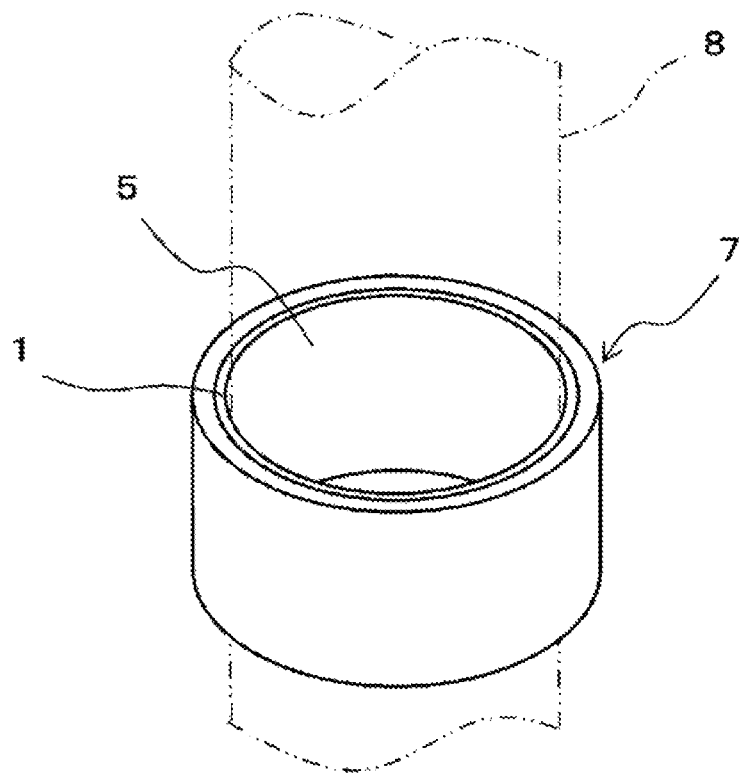
FIG. 2 is a perspective view of a bearing, as an example, in the present embodiment.
Figure 3:
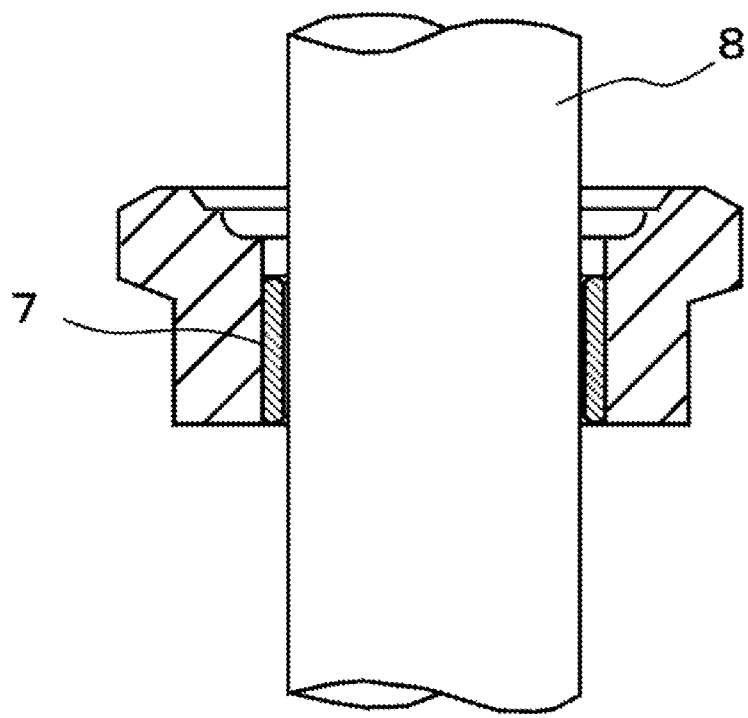
FIG. 3 is a sectional view of the bearing, as an example, in the present embodiment.

FIG. 2 is a perspective view of a bearing, as an example, in the present embodiment, and FIG. 3 is a sectional view of the bearing, as an example, in the present embodiment, in which the sliding member 1 in the present embodiment is used.

A bearing 7 in the present embodiment is configured such that the sliding member 1 shown in FIG. 1 is annularly formed with the sliding layer 5 being inwardly arranged. The bearing 7 supports a rod 8, as a mated member with the sliding layer 5 forming a cylindrical internal circumference. The bearing 7 is configured so that the rod 8 is slid under a linear motion.

The bearing 7 in the present embodiment is used for a vibration damping apparatus such as a shock absorber used for a vehicle or the like and is used as a sliding portion of a guide bushing for guiding a piston rod which reciprocates, in the shock absorber, with a motion of a suspension mechanism that displaces following a variation of a road surface or the like being transferred to the sliding portion.

In the sliding member 1, the rod 8, which is a piston rod, is a sliding mated member and the resin composition 4 forming the sliding layer 5 contacts the mated member directly or via a fluid such as oil. In the mated member of the sliding member 1, a surface thereof made of a stainless steel or Fe is configured to be covered with Cr (chromium) or Ti (titanium) by means of a method such as a plating method. The mated member of the sliding member 1 may be made of Cr, Ti themselves or their alloy.

Figure 4:
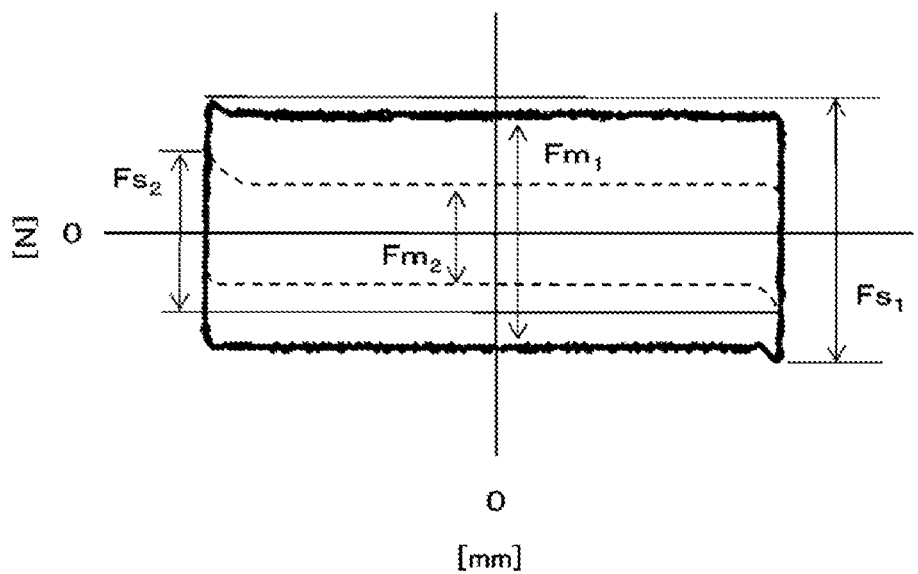
FIG. 4 is a graph showing a relationship between a static friction force and a dynamic friction force.

FIG. 4 is a graph showing a relationship between a static friction force and a dynamic friction force. In FIG. 4, a vertical axis indicates a friction force (N) and a horizontal axis indicates a stroke (mm). In the shock absorber used for a vehicle or the like, the piston rod reciprocates based on a fact that the suspension follows the variations of the road surface or the like. Based on the fact that the piston rod reciprocates, there is a state where the piston rod stands still.

Accordingly, in the guide bushing used for the shock absorber, in the case where the rate of change in a dynamic friction force $Fm_2$ in relation to a static friction force $Fs_2$ is large, as shown by broken lines in FIG. 4, it is felt uncomfortable to ride in the vehicle or the like. In the case where the static friction force $Fs_2$ is small, it is also felt uncomfortable to ride in the vehicle or the like. On the other hand, as shown in FIG. 4, in the case where the static friction force $Fs_1$ is large and the rate of change in the dynamic friction force $Fm_1$ in relation to the static friction force $Fs_1$ is small, the ride quality of the vehicles or the like is improved.

Hereinafter, the resin composition 4 is described in detail.

[Fluororesin]

The fluororesin which is a base resin of the resin composition 4 is a common synthetic resin having an excellent sliding characteristic to maintain a sufficient heat-resisting property for heat generated when any sliding friction occurs. Therefore, polytetrafluoroethylene (PTFE) resin, perfluoroalkoxy alkane (PFA), perfluoroethylene propene (FEP) copolymer, and ethylene tetrafluoroethylene (ETFE) copolymer are often used as the base resin of the resin composition of the sliding member.

The resin composition contains a fluororesin such as PTFE as an essential additive, and contains another fluororesin such as PFA other than PTFE as an optional additive. A content of another fluororesin contained as an optional component is 0 vol % or more and 20 vol % or less in the resin composition.

As the PTFE resin on the market, D-210C or F-201 of POLYFLON (registered trademark) manufactured by Daikin Industries, Ltd, AD911D of Fluon (registered trademark) manufactured by Asahi Glass Co., Ltd, 31JR or 6C-J of Teflon (registered trademark) manufactured by Chemours-Mitsui Fluoro products Co., Ltd and the like are exemplified.

[Zinc Compound]

The zinc compound (Zn compound) is an essential additive in the resin composition 4 forming the sliding layer 5 in order to improve the elastic modulus and the abrasion resistance. Examples of the Zn compound include zinc sulfide (ZnS), zinc oxide (ZnO), zinc sulfate (ZnSO$_4$), and the like.

It is preferable that the resin composition 4 contains 0.5 vol % or more and 20 vol % or less of the zinc compound. The resin composition 4 contains a predetermined amount of the zinc compound, so that the deformation of the sliding layer 5 can be prevented by the improvement of the elastic modulus, and an increase or decrease in a contact area due to deformation of the sliding layer 5 caused by an external force can be prevented.

In the case where the content of the zinc compound is less than 0.5 vol %, an increase in the elastic modulus may not be achieved. In addition, in the case where the content of the zinc compound exceeds 20 vol %, the static friction force controlled by the addition of carbon fibers may become excessive.

[Carbon Fiber]

The carbon fiber (CF) is a selective essential additive, i.e. either of the carbon fiber or iron oxide, or both of the carbon fiber and iron oxide being an essential additive, in the resin composition 4 forming the sliding layer 5 in order to improve the elastic modulus and the abrasion resistance. The carbon fiber is used as a function-imparting material and a reinforcing material for the resin composition 4 forming the sliding layer 5 which contacts a mated member directly or via a fluid such as oil. The resin composition 4 contains the carbon fiber, so that the value of the static friction force and the rate of change in the dynamic friction force in relation to the static friction force can be improved.

In the case where the iron oxide is contained, the resin composition 4 preferably contains 0 vol % or more and 20 vol % or less of the carbon fibers, and in the case where the iron oxide is not contained, the resin composition 4 preferably contains 0.5 vol % or more and 20 vol % or less of the carbon fibers. In the case where the carbon fiber is a pitch-based carbon fiber, it is preferable that the pitch-based carbon fiber has a fiber diameter of 5 μm or more and 20 μm or less, a fiber length of 10 μm or more and 150 μm or less, and an aspect ratio of 2 or more and 20 or less.

The carbon fiber has high strength, excellent abrasion resistance, high specific frequency, and excellent vibration damping and absorbing performance. These characteristics of the carbon fiber allow the abrasion resistance to be improved by containing a predetermined amount of the carbon fiber in the resin composition 4. In addition, the carbon fiber can increase the static friction force, and further, can improve the rate of change in the dynamic friction force in relation to the static friction force. In the case where the carbon fiber is the pitch-based carbon fiber, the rate of change in the dynamic friction force in relation to the static friction force can be reduced as compared with a PAN-based carbon fiber. As a result, the resin composition 4 contains a predetermined amount of the pitch-based carbon fiber as the carbon fiber, so that the value of the static friction force and the rate of change in the dynamic friction force in relation to the static friction force can be improved, and sliding characteristics can be improved.

In the case where the iron oxide is not contained and the content of the carbon fiber is less than 0.5 vol %, self-abrasion amount may increase, and the rate of change in the dynamic friction force in relation to the static friction force may not be improved. In the case where the content of the carbon fiber exceeds 20 vol %, the static friction force may be excessive. This may block its dispersiveness and deteriorate impregnation into the porous layer. It is to be noted that as the carbon fiber on the market, TORAYCA manufactured by Toray Industries, Inc., DONACARBO manufactured by Osaka Gas Chemicals Co., Ltd., DIALEAD manufactured by Mitsubishi Chemical Corporation and the like are exemplified.

[Iron Oxide]

Iron oxide is a selective essential additive, i.e. either of the iron oxide or carbon fiber, or both of the iron oxide and carbon fiber being an essential additive, in the resin composition 4 forming the sliding layer 5 in order to improve the elastic modulus and the abrasion resistance. Examples of iron oxide include FeO, $Fe_2O_3$, $Fe_3O_4$, and the like. The resin composition 4 contains a predetermined amount of the iron oxide, so that the elastic modulus can be improved in addition to the improvement in the abrasion resistance.

In the case where the carbon fiber is contained, the resin composition 4 preferably contains 0 vol % or more and 20 vol % or less of the iron oxide, and in the case where the carbon fiber is not contained, the resin composition 4 preferably contains 0.5 vol % or more and 20 vol % or less of the iron oxide.

In the case where the carbon fiber is not contained and the content of the iron oxide exceeds 20 vol %, the static friction force may be excessive. It is to be noted that as the iron oxide on the market, Bengara Color Series manufactured by MORISHITA BENGARA KOUGYO CO., LTD. and the like are exemplified.

In the resin composition 4, a content of the essential additives excluding the fluororesin is 10 vol % or more and 35 vol % or less in the resin composition. In the case where the content of the essential additives excluding the fluororesin is less than 10 vol % in the resin composition 4, the elastic modulus decreases. In addition, in the case where the content of the essential additives excluding the fluororesin exceeds 35 vol %, the abrasion resistance deteriorates.

[Barium Sulfate]

The barium sulfate ($BaSO_4$) is an optional additive in the resin composition 4 forming the sliding layer 5 in order to improve the elastic modulus and the abrasion resistance. It is preferable that the resin composition 4 contains 0 vol % or more and 20 vol % or less of the barium sulfate.

By adding a predetermined amount of barium sulfate to the resin composition 4, the resin composition 4 allows the abrasion resistance to be enhanced without hindering the elastic modulus from being improved when the zinc compound is added. It is to be noted that as the barium sulfate on the market, B30 series and BF series manufactured by Sakai Chemical Industry Co., Ltd., and the like are exemplified.

[Aramid Fiber]

The aramid fiber is an optional additive in the resin composition 4 forming the sliding layer 5 in order to improve the elastic modulus and the abrasion resistance. It is preferable that the resin composition 4 contains 0 vol % or more and 20 vol % or less of the aramid fiber.

By adding a predetermined amount of the aramid fiber to the resin composition 4, the resin composition 4 allows the abrasion resistance to be enhanced without hindering the elastic modulus from being improved when the zinc compound is added. It is to be noted that as the aramid fiber on the market, Kevlar (registered trademark) manufactured by DU PONT-TORAY CO., LTD., Twaron (registered trademark) manufactured by TEIJIN LIMITED and the like are exemplified.

[Graphite]

The graphite is an optional additive in the resin composition 4 forming the sliding layer 5 in order to improve the elastic modulus and the abrasion resistance. It is preferable that the resin composition 4 contains 0 vol % or more and 20 vol % or less of the graphite.

By adding a predetermined amount of the graphite to the resin composition 4, the resin composition 4 allows the frictional resistance to be decreased without hindering the elastic modulus from being improved when the zinc compound is added. It is to be noted that as the graphite on the market, GRAPHITE POWDER SERIES manufactured by Nippon Kokuen Group and the like are exemplified.

[Molybdenum Disulfide]

The molybdenum disulfide is an optional additive in the resin composition 4 forming the sliding layer 5 in order to improve the elastic modulus and the abrasion resistance. It is preferable that the resin composition 4 contains 0 vol % or more and 20 vol % or less of the molybdenum disulfide.

By adding a predetermined amount of the molybdenum disulfide to the resin composition 4, the resin composition 4 allows the frictional resistance to be decreased without hindering the elastic modulus from being improved when the zinc compound is added.

It is to be noted that as the molybdenum disulfide on the market, H/GMoS2 manufactured by TAIYO KOKO Co., Ltd., Molybdenum Disulfide Powder Series manufactured by DAIZO CORPORATION and the like are exemplified.

[Calcium Compound]

The calcium compound is an optional additive in the resin composition 4 forming the sliding layer 5 in order to improve the elastic modulus and the abrasion resistance. Examples of the calcium compound include calcium carbonate ($CaCO_3$), calcium sulfate ($CaSO_4$), calcium hydroxide ($Ca(OH)_2$), and the like. It is preferable that the resin composition 4 contains 0 vol % or more and 20 vol % or less of the calcium compound.

By adding a predetermined amount of the calcium compound to the resin composition 4, the resin composition 4 allows the abrasion resistance to be improved without hindering the elastic modulus from being improved when the zinc compound is added.

[Zinc or Zinc Alloy]

Zinc (Zn) or a zinc alloy (Zn alloy) is an optional additive in the resin composition 4 forming the sliding layer 5 in order to improve the elastic modulus and the abrasion resistance. It is preferable that the resin composition 4 contains 0 vol % or more and 20 vol % or less of either of Zn or Zn alloy or both of Zn and Zn alloy. A particle diameter of Zn or Zn alloy is preferably 1 μm or more and 50 μm or less, more preferably 1 μm or more and 25 μm or less, when considering dispersiveness to the fluororesin and a thickness of the resin layer made of the resin composition.

Examples of the Zn alloy includes the following Zn alloy: Zn alloy containing 3.5 weight % or more and 4.3 weight % or less of Al, 0.75 weight % or more and 1.25 weight % or less of Cu, 0.020 weight % or more and 0.06 weight % or less of Mg, 0.10 weight % or less of Fe, with the remainder being Zn and inevitable impurities, assuming the weight of the Zn alloy as 100.

In addition, examples of the Zn alloy also includes the following Zn alloy: Zn alloy containing 3.5 weight % or more and 4.3 weight % or less of Al, 0.25 weight % or less of Cu, 0.020 weight % or more and 0.06 weight % or less of Mg, 0.10 weight % or less of Fe, with the remainder being Zn and inevitable impurities, assuming the weight of the Zn alloy as 100.

By adding a predetermined amount of either of the Zn or Zn alloy or both of the Zn and Zn alloy to the resin composition 4, the resin composition 4 allows the abrasion resistance to be improved without hindering the elastic modulus from being improved when the zinc compound is added.

In the case where either of the Zn or Zn alloy or both of the Zn and Zn alloy is added and the content thereof exceeds 20 vol %, the abrasion resistance may decrease.

In the resin composition 4, a total content of the essential additives excluding the fluororesin and the optional additives is 10 vol % or more and 35 vol % or less in the resin composition. In the case where the total content of the essential additives excluding the fluororesin and the optional additives is less than 10 vol % in the resin composition 4, the elastic modulus decreases. In addition, in the case where the content of the essential additives excluding the fluororesin exceeds 35 vol %, the abrasion resistance decreases.

EXAMPLES

Test pieces were prepared using the resin compositions having compositions of Examples 1 to 8 and Comparison Examples 1 to 3 shown in Table 1, and their elastic modulus was measured. In addition, bushings were prepared using sliding members having compositions of Examples 1 to 8 and Comparison Examples 1 to 3 shown in Table 1, and their abrasion amount was measured.

(1) Elastic Modulus
Test Piece
   Size: 8 mm×45 mm×1 mm
   Molding Method: extrusion molding
   Baking Method: baking furnace
   Baking Conditions: 490° C.-10 min
Measurement Conditions
   Strain Amplitude: 10 μm
   Minimum Force Amplitude: 1000 mN
   Test Time: 5 min
   Temperature Control: 20° C.
   Plate Thickness: about 0.8 mm to 0.95 mm
   Plate Width: about 10 mm
Determination Criteria
   Elastic modulus being 600 MPa or more: proper
   Elastic modulus being less than 600 MPa: improper (2) Abrasion Amount
Test Piece
   Size: bushing inner diameter 12.5 mm×total length 8.0 mm×plate thickness 1.0 mm
Measurement Conditions
   Stroke: 10 mm
   Rate: 40 mm/sec
   Load: 100 kg
   Test Time: 40 min
   Lubrication: dry
Determination Criteria
   A: Abrasion amount is 0.02 mm or less
   B: Abrasion amount exceeds 0.02 mm and is less than 0.03 mm
   C: Abrasion amount exceeds 0.03 mm

TABLE 1

| | | Examples | | | | | | | | Comparison Examples | | |
|---|---|---|---|---|---|---|---|---|---|---|---|---|
| Added elements | | 1 | 2 | 3 | 4 | 5 | 6 | 7 | 8 | 1 | 2 | 3 |
| Essential additive | ZnS | 5 | 10 | 13 | 6 | 13 | 13 | 8 | 2 | | 2 | 10 |
| Selective essential additive | $Fe_2O_3$ | | 2 | 2 | 10 | 10 | 12 | 11 | | | 2 | 10 |
| | CF | 5 | 2 | 5 | 3 | 3 | | 3 | 9 | | 2 | |
| Optional additive | $BaSO_4$ | | | | | | | 5 | | | | 20 |
| | Aramid fiber | | 5 | | 3 | | | | | 2 | | |
| | Graphite | | | | | | | | 4 | | | |
| | Molybdenum disulfide | | | | | | | | 7 | | | |
| | Calcium compound | | 2 | | | | | | | | | |
| | Zn or Zn alloy | | | | | | | | 2 | | | |
| Total amount of additives (excluding fluororesin) | | 10 | 21 | 20 | 22 | 26 | 25 | 27 | 24 | 2 | 6 | 40 |
| Fluororesin | PFA | | 3 | 5 | 3 | 5 | 5 | 3 | | | | |
| | PTFE | 90 | 76 | 75 | 75 | 69 | 70 | 70 | 76 | 98 | 94 | 60 |
| Evaluation | Elastic modulus (MPa) | 659.3 | 930.0 | 839.0 | 878.1 | 1041.3 | 1056.7 | 1020.8 | 632.5 | 471.0 | 583.2 | 1469.9 |
| | Abrasion | A | A | A | A | A | A | A | A | C | B | B |

In Example 1, the resin composition contains 5 vol % of zinc sulfide (ZnS) as a zinc compound, which is an essential additive, within the range specified in the present invention, and 5 vol % of the carbon fiber within the range specified in the present invention. The total content of the zinc compound and the carbon fiber is 10 vol % and is within the range specified in the present invention. The resin composition does not contain optional additives. The remainder contains 90 vol % of PTFE as the fluororesin. In Example 1, the elastic modulus was 600 MPa or more and was a desired proper value. In Example 1, the abrasion amount was 0.02 mm or less and was a desired proper value.

In Example 2, the resin composition contains 10 vol % of zinc sulfide (ZnS) as a zinc compound, which is an essential additive, within the range specified in the present invention, 2 vol % of the iron oxide ($Fe_2O_3$) within the range specified in the present invention, and 2 vol % of the carbon fiber within the range specified in the present invention. In addition, the resin composition contains, as optional additives, 5 vol % of the aramid fiber within the range specified in the present invention and 2 vol % of the calcium compound within the range specified in the present invention. The total content of the essential additives excluding the fluororesin and the optional additives is 21 vol % and is within the range specified in the present invention. Further, the resin composition contains 3 vol % of PFA, as a fluororesin, within the range specified in the present invention, and the remainder contains 76 vol % of PTFE as a fluororesin. In Example 2, the elastic modulus was 600 MPa or more and was a desired proper value. In Example 2, the abrasion amount was 0.02 mm or less and was a desired proper value.

In Example 3, the resin composition contains 13 vol % of zinc sulfide (ZnS) as a zinc compound, which is an essential additive, within the range specified in the present invention, 2 vol % of the iron oxide ($Fe_2O_3$) within the range specified in the present invention, and 5 vol % of the carbon fiber within the range specified in the present invention. The content of the essential additives excluding the fluororesin is 20 vol % and is within the range specified in the present invention. The resin composition does not contain optional additives. Further, the resin composition contains 5 vol % of PFA, as a fluororesin, within the range specified in the present invention, and the remainder contains 75 vol % of PTFE as a fluororesin. In Example 3, the elastic modulus was 600 MPa or more and was a desired proper value. In Example 3, the abrasion amount was 0.02 mm or less and was a desired proper value.

In Example 4, the resin composition contains 6 vol % of zinc sulfide (ZnS) as a zinc compound, which is an essential additive, within the range specified in the present invention, 10 vol % of the iron oxide ($Fe_2O_3$) within the range specified in the present invention, and 3 vol % of the carbon fiber within the range specified in the present invention. In addition, the resin composition contains 3 vol % of the aramid fiber within the range specified in the present invention as an optional additive. The total content of the essential additives excluding the fluororesin and the optional additives is 22 vol % and is within the range specified in the present invention. Further, the resin composition contains 3 vol % of PFA, as a fluororesin, within the range specified in the present invention, and the remainder contains 75 vol % of PTFE as a fluororesin. In Example 4, the elastic modulus was 600 MPa or more and was a desired proper value. In Example 4, the abrasion amount was 0.02 mm or less and was a desired proper value.

In Example 5, the resin composition contains 13 vol % of zinc sulfide (ZnS) as a zinc compound, which is an essential additive, within the range specified in the present invention, 10 vol % of the iron oxide ($Fe_2O_3$) within the range specified in the present invention, and 3 vol % of the carbon fiber within the range specified in the present invention. The content of the essential additives excluding the fluororesin is 26 vol % and is within the range specified in the present invention. The resin composition does not contain optional additives. Further, the resin composition contains 5 vol % of PFA, as a fluororesin, within the range specified in the present invention, and the remainder contains 69 vol % of PTFE as a fluororesin. In Example 5, the elastic modulus was 1000 MPa or more and was a desired proper value. In Example 5, the abrasion amount was 0.02 mm or less and was a desired proper value.

In Example 6, the resin composition contains 13 vol % of zinc sulfide (ZnS) as a zinc compound, which is an essential additive, within the range specified in the present invention, and 12 vol % of the iron oxide ($Fe_2O_3$) within the range specified in the present invention. The content of the essential additives excluding the fluororesin is 25 vol % and is within the range specified in the present invention. The resin composition does not contain optional additives. Further, the resin composition contains 5 vol % of PFA, as a fluororesin, within the range specified in the present invention, and the remainder contains 70 vol % of PTFE as a fluororesin. In Example 6, the elastic modulus was 1000 MPa or more and was a desired proper value. In Example 6, the abrasion amount was 0.02 mm or less and was a desired proper value.

In Example 7, the resin composition contains 8 vol % of zinc sulfide (ZnS) as a zinc compound, which is an essential additive, within the range specified in the present invention, 11 vol % of the iron oxide ($Fe_2O_3$) within the range specified in the present invention, and 3 vol % of the carbon fiber within the range specified in the present invention. In addition, the resin composition contains 5 vol % of the barium sulfate ($BaSO_4$) within the range specified in the present invention as an optional additive. The total content of the essential additives excluding the fluororesin and the optional additives is 27 vol % and is within the range specified in the present invention. Further, the resin composition contains 3 vol % of PFA, as a fluororesin, within the range specified in the present invention, and the remainder contains 70 vol % of PTFE as a fluororesin. In Example 7, the elastic modulus was 1000 MPa or more and was a desired proper value. In Example 7, the abrasion amount was 0.02 mm or less and was a desired proper value.

In Example 8, the resin composition contains 2 vol % of zinc sulfide (ZnS) as a zinc compound, which is an essential additive, within the range specified in the present invention, and 9 vol % of the carbon fiber within the range specified in the present invention. In addition, the resin composition contains, as optional additives, 4 vol % of graphite within the range specified in the present invention, 7 vol % of molybdenum disulfide within the range specified in the present invention, and 2 vol % of Zn or Zn alloy within the range specified in the present invention. The total content of the essential additives excluding the fluororesin and the optional additives is 24 vol % and is within the range specified in the present invention. Further, the remainder contains 76 vol % of PTFE as a fluororesin. In Example 8, the elastic modulus was 600 MPa or more and was a desired proper value. In Example 8, the abrasion amount was 0.02 mm or less and was a desired proper value.

In the resin compositions of Examples 1 to 5, 7 and 8 containing carbon fibers (CF), the elastic modulus and the abrasion amount were proper values regardless of whether the carbon fibers were pitch-based carbon fibers or PAN-based carbon fibers. As compared with the case of Example 6 containing no carbon fibers (CF), the static friction force can be increased to a desired value, and the rate of change in the dynamic friction force in relation to the static friction force can be improved. When the carbon fibers described in Examples 1 to 5, 7 and 8 were pitch-based carbon fibers, the rate of change in the dynamic friction force in relation to the static friction force can be reduced as compared with the case of Example 6 containing no carbon fibers (CF), and the rate of change in the dynamic friction force in relation to the static friction force can be further reduced as compared with the case where the PAN-based carbon fibers were contained.

In the shock absorber embodied in a vehicle or the like, the sliding member is used in a guide bushing for guiding a piston rod to which a motion of a suspension mechanism that displaces following a variation of a road surface or the like is transferred to make a reciprocating motion.

The shock absorber damps vibration utilizing viscosity resistance of a liquid therein against any input from outside. On the other hand, it has been found that any friction force generated by the guide bushing which guides the reciprocating motion of the piston rod has an influence on ride quality of a vehicle or the like.

In other words, a relationship between a static friction force which acts when a static piston rod starts to move and a dynamic friction force which acts when a piston rod moves has an influence on the ride quality of a vehicle or the like. Therefore, the static friction force can be increased, and the rate of change in the dynamic friction force in relation to the static friction force can be reduced, so that the ride quality can be improved when the sliding member of the present invention is applied to the shock absorber.

In contrast, in Comparative Example 1, the resin composition does not contain any of a zinc compound, carbon fibers, and iron oxide which are essential additives in the present invention, and contains 2 vol % of the aramid fibers, which are an optional additive in the present invention, within the range specified in the present invention, and a total content of the essential additives and optional additives is out of the range specified in the present invention and the remainder contains 98 vol % of PTFE as a fluororesin. In Comparison Example 1, the elastic modulus was less than 600 MPa and was not a desired proper value as desired. In Comparison Example 1, the abrasion amount exceeded 0.03 mm and was not a desired proper value.

In Comparison Example 2, the resin composition contains 2 vol % of the zinc sulfide (ZnS) as a zinc compound, which is an essential additive, within the range specified in the present invention, 2 vol % of the iron oxide ($Fe_2O_3$) within the range specified in the present invention, and 2 vol % of the carbon fibers within the range specified in the present invention, but a content of the essential additives excluding the fluororesin is 6 vol % and is less than the lower limit of the range specified in the present invention, and the remainder contains 94 vol % of PTFE as a fluororesin. In Comparison Example 2, the elastic modulus was less than 600 MPa and was not a desired proper value. In Comparison Example 2, the abrasion amount exceeded 0.02 mm and was not a desired proper value.

In Comparison Example 3, the resin composition contains 10 vol % of the zinc sulfide (ZnS) as a zinc compound, which is an essential additive, within the range specified in the present invention, 10 vol % of the iron oxide ($Fe_2O_3$) within the range specified in the present invention, and 20 vol % of barium sulfate ($BaSO_4$) as an optional additive within the range specified in the present invention, but a total content of the essential additives excluding the fluororesin and the optional additives is 40 vol % and exceeds the upper limit of the range specified in the present invention, and the remainder contains 60 vol % of PTFE as a fluororesin. In Comparison Example 3, the elastic modulus was a desired proper value, but the abrasion amount exceeded 0.02 mm and was not a desired proper value.

Therefore, it has been found that, even if a resin composition contains the zinc compound within the range specified in the present invention and contains either of the carbon fiber or the iron oxide or both of the carbon fiber and the iron oxide within the range specified in the present invention, when a content of additives excluding the fluororesin is out of the range specified in the present invention, either of the elastic modulus or the abrasion amount or both of the elastic modulus and the abrasion amount cannot be a desired value.

Accordingly, it has been found that the elastic modulus is improved when the resin composition contains, as essential additives, 0.5 vol % or more and 20 vol % or less of the zinc compound and more than 0 vol % and 20 vol % or less of either or both of the carbon fiber and the iron oxide, a total content of essential additives excluding the fluororesin is 10 vol % or more and 35 vol % or less, and in the case where optional additive(s) is contained, a total content of essential additives excluding the fluororesin and optional additive(s) is 10 vol % or more and 35 vol % or less. In addition, it has been found that the abrasion amount is reduced.

REFERENCE SIGNS LIST

1: Sliding member
2: Metallic substrate
3: Porous layer
4: Resin composition
5: Sliding layer
7: Bearing

The invention claimed is:
1. A sliding member comprising:
a metallic substrate;
a porous layer formed on a surface of the metallic substrate; and
a sliding layer that covers the porous layer,
wherein the porous layer is made of a metal itself or an alloy composition,
wherein the sliding layer is made of a lead-free resin composition,
wherein the resin composition consists of an essential additive, optionally an optional additive, with the remainder being a fluororesin consisting of a combination of polytetrafluoroethylene and perfluoroalkoxy alkane, the essential additive being any one of a combination of zinc sulfide and an iron oxide, and a combination of zinc sulfide, a carbon fiber and an iron oxide, the optional additive being at least one selected from the group consisting of aramid fibers, graphite, molybdenum disulfide, calcium compounds, and zinc or zinc alloys,
wherein a total content of the essential additive and the optional additive is 20 vol % or more and 35 vol % or less in the resin composition, wherein a content of zinc sulfide in the resin composition is 6 vol % or more and 20 vol % or less, and wherein a content of iron oxide in the resin composition is 0.5 vol % or more and 12 vol % or less, and
wherein a content of perfluoroalkoxy alkane is 3 vol % or more and 5 vol % or less in the resin composition.

2. The sliding member according to claim 1, wherein the resin composition consists of the essential additive with the remainder being the fluororesin.

3. The sliding member according to claim 1, wherein a content of the carbon fiber is 0 vol % or more and 20 vol % or less in the resin composition.

4. The sliding member according to claim 1, wherein the essential additive is the combination of zinc sulfide, a carbon fiber and an iron oxide.

5. A bearing comprising the sliding member according to claim 1, wherein the sliding layer is a cylindrical internal circumference and annular innermost layer.

6. A bearing comprising the sliding member according to claim 2, wherein the sliding layer is a cylindrical internal circumference and annular innermost layer.

7. A bearing comprising the sliding member according to claim 3, wherein the sliding layer is a cylindrical internal circumference and annular innermost layer.

8. The sliding member according to claim 1, wherein:
a content of the fluororesin is 75 vol % or more and 80 vol % or less in the resin composition.

* * * * *